(12) United States Patent
Hanson

(10) Patent No.: US 10,082,039 B2
(45) Date of Patent: Sep. 25, 2018

(54) SEGMENTED ANNULAR SEAL

(71) Applicant: UNITED TECHNOLOGIES CORPORATION, Farmington, CT (US)

(72) Inventor: Russell B. Hanson, Jupiter, FL (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 154 days.

(21) Appl. No.: 15/341,598

(22) Filed: Nov. 2, 2016

(65) Prior Publication Data

US 2018/0119559 A1    May 3, 2018

(51) Int. Cl.
*F16J 15/447* (2006.01)
*F01D 11/02* (2006.01)
(Continued)

(52) U.S. Cl.
CPC .......... *F01D 11/025* (2013.01); *F04D 29/083* (2013.01); *F16J 15/442* (2013.01); *F16J 15/445* (2013.01); *F16J 15/447* (2013.01); *F16J 15/4472* (2013.01); *F01D 5/02* (2013.01); *F01D 25/24* (2013.01); *F04D 29/053* (2013.01); *F04D 29/32* (2013.01); *F04D 29/522* (2013.01); *F05D 2220/32* (2013.01); *F05D 2230/60* (2013.01); *F05D 2240/60* (2013.01);
(Continued)

(58) Field of Classification Search
CPC .......... F01D 11/025; F01D 5/02; F01D 25/24; F04D 29/083; F04D 29/053; F04D 29/32; F04D 29/522; F16J 15/442; F16J 15/447; F16J 15/445; F16J 15/4472; F05D 2220/32; F05D 2230/60; F05D 2240/60; F05D 2250/141; F05D 2260/36
USPC .......................................................... 277/416
See application file for complete search history.

(56) References Cited

U.S. PATENT DOCUMENTS 4,662,821 A * 5/1987 Kervistin .............. F01D 11/001
                                                        415/116
7,066,470 B2 * 6/2006 Turnquist .............. F01D 11/025
                                                        277/355
(Continued)

FOREIGN PATENT DOCUMENTS

| FR | 1232053 | 10/1960 |
|---|---|---|
| WO | 2004053365 | 6/2004 |
| WO | 2016022136 | 2/2016 |

OTHER PUBLICATIONS

European Patent Office, European Search Results dated Feb. 27, 2018 in Application No. 17186968.8-1015.

*Primary Examiner* — Nathan Cumar
(74) *Attorney, Agent, or Firm* — Snell & Wilmer L.L.P.

(57) ABSTRACT

An annular seal includes an annular outer casing, a plurality of seal segments, and a plurality of spring components. The plurality of seal segments is coupled to the annular outer casing to cumulatively form an annular sealing surface, the annular sealing surface is configured to face a rotating structure to inhibit fluid leakage between the rotating structure and the annular sealing surface, and each seal segment of the plurality of seal segments is configured for independent radial movement relative to other seal segments of the plurality of seal segments. In various embodiments, the plurality of spring components are configured to bias the plurality of seal segments relative to the radial movement.

20 Claims, 4 Drawing Sheets

(51) Int. Cl.
  F04D 29/08  (2006.01)
  F16J 15/44  (2006.01)
  *F01D 5/02*  (2006.01)
  *F01D 25/24*  (2006.01)
  *F04D 29/053*  (2006.01)
  *F04D 29/32*  (2006.01)
  *F04D 29/52*  (2006.01)

(52) U.S. Cl.
  CPC .... *F05D 2250/141* (2013.01); *F05D 2250/41* (2013.01); *F05D 2260/36* (2013.01)

(56) References Cited

U.S. PATENT DOCUMENTS

| | | |
|---|---|---|
| 8,002,285 B2 | 8/2011 | Justak |
| 8,172,232 B2 | 5/2012 | Justak |
| 8,919,781 B2 | 12/2014 | Justak |
| 2007/0237628 A1 | 10/2007 | Adis |
| 2009/0274548 A1* | 11/2009 | Joco ........................ F01D 11/02 415/112 |
| 2010/0239415 A1* | 9/2010 | Turnquist .............. F01D 11/025 415/174.2 |

* cited by examiner

SEGMENTED ANNULAR SEAL

GOVERNMENT LICENSE RIGHTS

This disclosure was made with government support under contract No. FA8650-09-D-2923-AETD awarded by the United States Air Force. The government has certain rights in the disclosure.

FIELD

The present disclosure relates to an annular seal, and more specifically, to a static annular seal positioned around a rotating structure.

BACKGROUND

Many machines, assemblies, and systems, across a variety of industries, have rotating elements that interface with static, non-rotating elements. In certain applications, fluid seals are implemented to prevent fluid leakage between the rotating elements and the static elements. For example, rotating airfoils and/or shafts in in gas turbine engines generally utilize a variety of seals to interface with static elements in order to prevent fluid leakage. Conventional seals, however, are often difficult to manufacture and install. For example, a single conventional annular seal in a gas turbine engine may involve hours of painstaking machining. Occasionally pieces of a conventional annular seal may become dislodged during the machining process (e.g., during electrical discharge machining "EDM") and thus the part may be scrapped, despite the material and time already invested in its manufacture.

SUMMARY

Disclosed herein, according to various embodiments, is an annular seal that includes an annular outer casing, a plurality of seal segments, and a plurality of spring components. The plurality of seal segments is coupled to the annular outer casing to cumulatively form an annular sealing surface, the annular sealing surface is configured to face a rotating structure to inhibit fluid leakage between the rotating structure and the annular sealing surface, and each seal segment of the plurality of seal segments is configured for independent radial movement relative to other seal segments of the plurality of seal segments. In various embodiments, the plurality of spring components are configured to bias the plurality of seal segments relative to the radial movement.

In various embodiments, the annular outer casing includes a plurality of radially extending mount holes configured to receive a corresponding structure of the plurality of seal segments. In various embodiments, each seal segment of the plurality of seal segments includes a trunnion configured to be received within a respective one of the plurality of radially extending mount holes. The trunnion of each seal segment of the plurality of seal segments may be configured to slide within a respective one of the plurality of radially extending mount holes. In various embodiments, the plurality of radially extending mount holes are cylindrical and the trunnion of each seal segment of the plurality of seal segments is cylindrical.

In various embodiments, the plurality of spring components are independent of and separable from the plurality of seal segments. In various embodiments, the plurality of spring components include two spring components per seal segment of the plurality of seal segments. For example, the two spring components may include a forward spring component and an aft spring component. The forward spring component and the aft spring component may be coupled to a flange of the annular outer casing and to a radially outer surface of each seal segment of the plurality of seal segments.

In various embodiments, the annular sealing surface includes a knife-edge ridge to inhibit fluid leakage between the rotating structure and the annular sealing surface. An orientation of the knife-edge ridge relative to the rotating structure may be maintained throughout the radial movement of the plurality of seal segments. In various embodiments, the annular seal further includes a unitary annular plate configured to engage with at least one of an aft surface and a forward surface of the plurality of seal segments.

Also disclosed herein, according to various embodiments, is a gas turbine engine that includes a rotating structure, an annular outer casing, a plurality of seal segments, and a plurality of spring. The plurality of seal segments may be coupled to the annular outer casing to cumulatively form an annular sealing surface, the annular sealing surface may be configured to face the rotating structure to inhibit fluid leakage between the rotating structure and the annular sealing surface, and each seal segment of the plurality of seal segments may be configured for independent radial movement relative to other seal segments of the plurality of seal segments. In various embodiments, the plurality of spring components are configured to bias the plurality of seal segments relative to the radial movement.

In various embodiments, the rotating structure is a rotating shaft of the gas turbine engine. In various embodiments, the rotating structure is a series of airfoil rotors of the gas turbine engine. The annular outer casing may be coupled to at least one of a fan section, a compressor section, and a turbine section of the gas turbine engine. The annular outer casing may be secured to a case of the gas turbine engine via at least one of a retaining ring and a retaining clip.

Also disclosed herein, according to various embodiments, is a method of manufacturing an annular seal. The method may include forming a plurality of seal segments, forming a plurality of spring components that are independent of and separable from the plurality of seal segments, coupling the plurality of seal segments to an annular outer casing such that the plurality of seal segments cumulatively forms an annular sealing surface, and coupling the plurality of spring components to the plurality of seal segments and the annular outer casing.

In various embodiments, coupling the plurality of seal segments to the annular outer casing includes inserting trunnions of the plurality of seal segments into radially extending mount holes of the annular outer casing. In various embodiments, coupling the plurality of spring components to the plurality of seal segments includes coupling a forward spring component and an aft spring component, of the plurality of spring components, to a forward portion of each spring component and an aft portion of each spring component, respectively, of the plurality of spring components.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1:
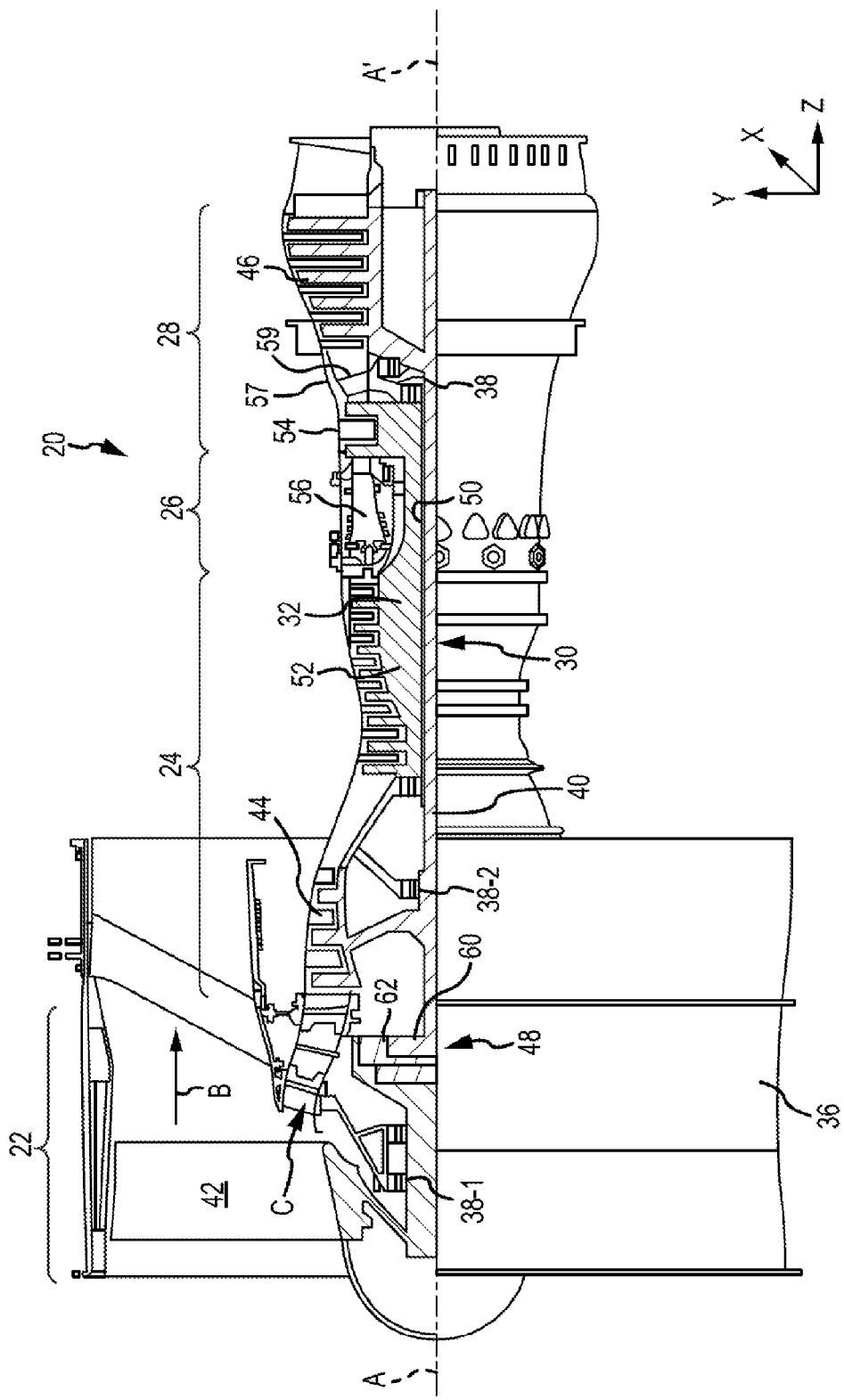
FIG. 1 illustrates a cross-sectional view of an exemplary gas turbine engine, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

In various embodiments, an annular seal 100 (FIGS. 2A and 2B) is disclosed herein. The annular seal 100 may be implemented in a variety of different machines, assemblies, and/or systems across various industries, such as ground-based gas turbines, nuclear power plants, gas turbine engines for aircraft, etc. While specific and repeated reference to the implementation of the annular seal 100 in a gas turbine engine 20 (FIG. 1) is included herein, the scope of the present disclosure is not limited to gas turbine engines.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant (e.g., air) along a bypass flow-path B while compressor section 24 can drive coolant along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction on the provided xyz axis. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion. As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

As described above, conventional annular seals often involve difficult, expensive, and/or time-intensive manufacturing methods. The present disclosure, however, provides an annular seal and related methods of manufacture, according to various embodiments, that tends to reduce costs, manufacturing time, and ease of manufacturing relative to conventional seals.

Figure 2:
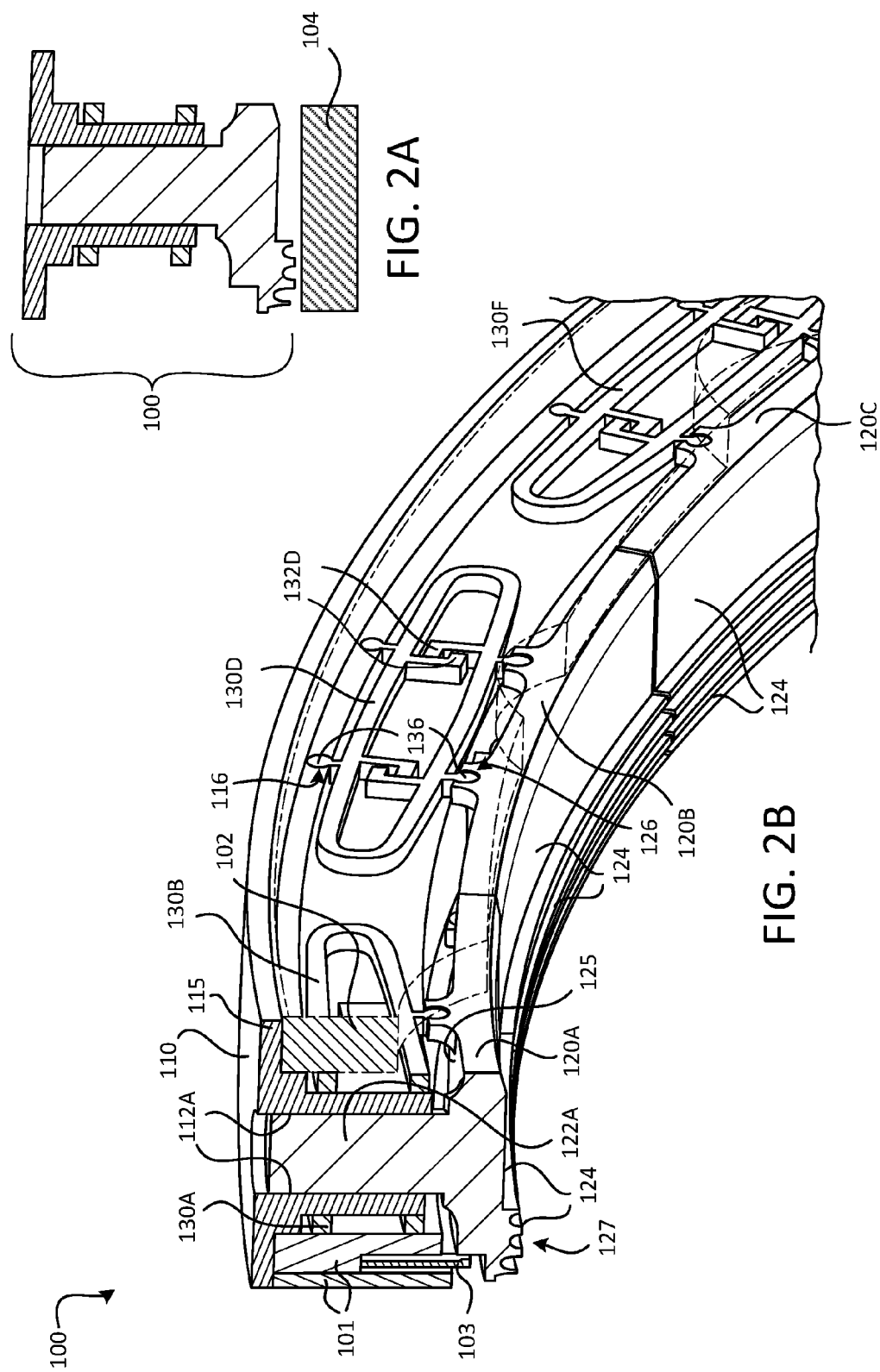
FIG. 2A illustrates a cross-sectional view of an annular seal and a rotating structure, in accordance with various embodiments.
FIG. 2B illustrates a perspective cross-sectional view of an annular seal, in accordance with various embodiments.
Figure 3:
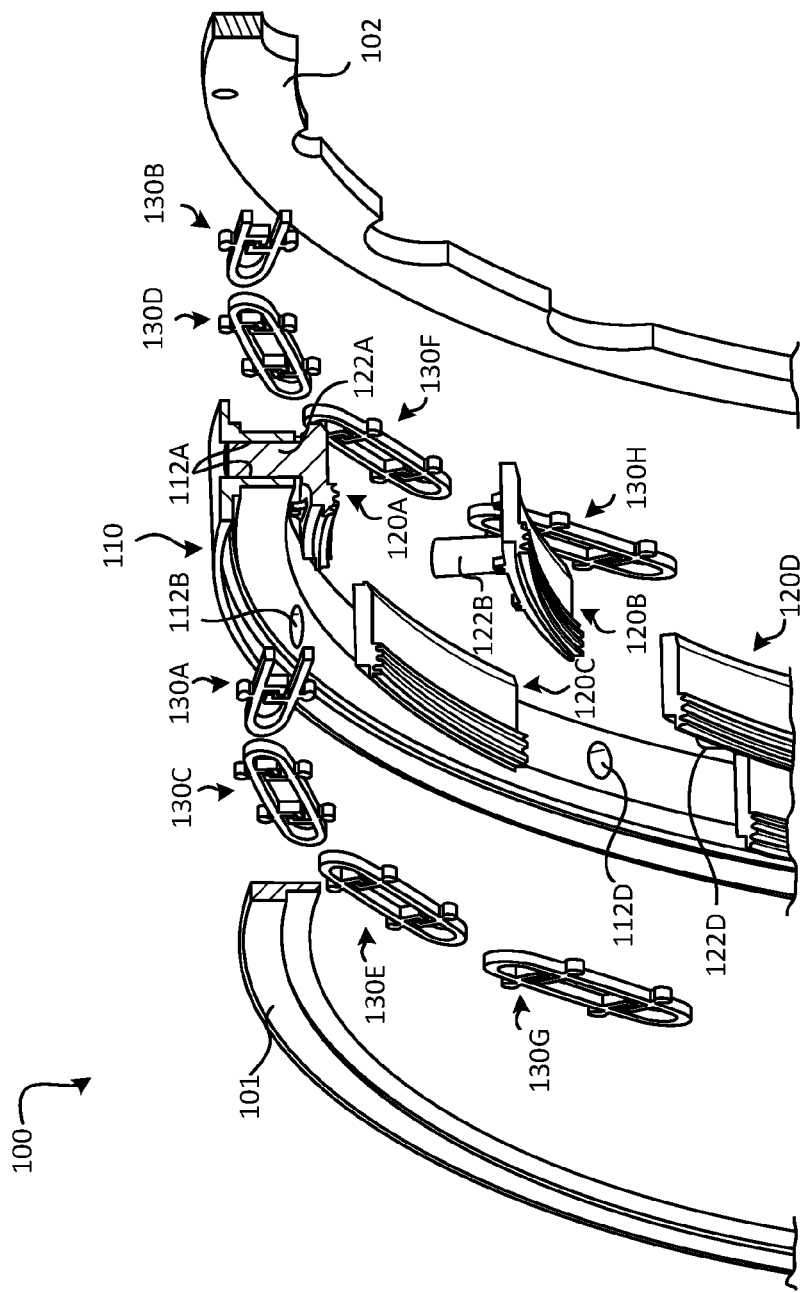
FIG. 3 illustrates an exploded perspective cross-sectional view of an annular seal, in accordance with various embodiments.

In various embodiments, and with reference to FIG. 2A-3, an annular seal 100 is disclosed. The annular seal 100 is generally configured to prevent, or at least inhibit, fluid leakage between a rotating structure 104 and the annular seal 100. The annular seal 100 is segmented, as described in greater detail below. Additional details pertaining to the method of manufacturing the annular seal 100 are included below with reference to FIG. 4. The annular seal 100, according to various embodiments, includes an annular outer casing 110, a plurality of seal segments 120 (reference number "120" refers collectively to all the individual seal segments 120A, 120B, 120C, and 120D shown in the figures), and a plurality of spring components 130 (reference number "130" refers collectively to all the spring components 130A, 130B, 130C, 130D, 130E, 130F, 130G, and 130H shown in the figures).

Generally, the plurality of seal segments 120 are arcuate sections that are coupled to the annular outer casing 110, according to various embodiments. Each seal segment of the plurality of seal segments 120 may be configured to radially move, independent of the other seal segments, relative to the annular outer casing 110, thereby allowing the annular seal to radially self-adjust in response to, for example, operating conditions of the gas turbine engine 20 (e.g., temperature, pressure, thermal expansion, etc.). The plurality of spring components 130 are generally coupled between the annular outer casing 110 and the plurality of seal segments 120 and are configured to bias the plurality of seal segments 120, relative to the radial movement of the plurality of seal segments, thereby controlling and/or restricting the radial movement of the plurality of seal segments 120 in order to improve the leak inhibiting ability of the annular seal 100.

More specifically, and in accordance with various embodiments, the plurality of seal segments 120 collectively form an annular sealing surface 124, once coupled to the annular outer casing 110, that faces the rotating structure 104. The seal assembly 100 may be a separable assembly or the seal assembly 100 may be a permanent assembly. That is, the various seal segments 120 may be coupled together in a detachable/separable fashion or the seal segments 120 may be permanently coupled together using various weldment-type fabrication procedures. The rotating structure 104 may be one of various components of the gas turbine engine 20. For example, the rotating structure 104 about which the annular seal 100 is configured to be disposed may be a rotating shaft, a rotating spool (e.g., low speed spool 30 and a high speed spool 32 described above), and/or a series of airfoil rotors (e.g., fan blades, compressor blades, and/or turbine blades), among others. In various embodiments, the annular sealing surface 124 cumulatively formed from the plurality of seal segments 120 may include features for improving the sealing function. For example, the annular sealing surface 124 may include one or more knife-edge ridges 127 (or knife-edge grooves) that create a tortuous flow path (e.g., a labyrinth seal configuration) that helps to prevent fluid leakage between the annular sealing surface 124 and the rotating structure. In various embodiments, the annular seal 100 may be a non-contact seal relative to the rotating structure 104 and thus may be configured to "float" on a film of air.

The plurality of seal segments 120 can be coupled to the annular outer casing 110 to form the annular sealing surface 124. The plurality of spring components 130, according to various embodiments, are independent of and separable from the plurality of seal segments 120 and the annular outer casing 110. That is, according to various embodiments, the plurality of spring components 130 are not unitary with and are not integrally formed in the plurality of seal segments 120 or the annular outer casing 110. In various embodiments, because the spring components 130 are independently formed relative to the plurality of seal segments 120, the intricacy and complexity of individual seal segments of the plurality of seal segments 120 is comparatively reduced (when compared with conventional seals), thereby further simplifying the manufacturing process (as described in greater detail below with reference to FIG. 4).

In various embodiments, the annular outer casing 110 includes a plurality of mount holes 112 (reference number "112" refers collectively to all the individual mount holes 112A, 112B, and 120D shown in the figures). The plurality of mount holes 112, according to various embodiments, extend in a substantially radial direction. In various embodiments, the plurality of mount holes 112 correspond to the number of seal segments 120 of the annular seal 100 and are configured to receive a corresponding mounting structure of the plurality of seal segments 120. For example, and with reference to FIG. 3, a first seal segment 120A may have a first trunnion 122A that is received within a first mount hole 112A of the annular outer casing 110. In various embodiments, and with continued reference to FIG. 3, a second seal segment 120B is shown a distance removed from the annular outer casing 110 and a second mount hole 112B is visible in the annular outer casing 110. As described in greater detail below with reference to FIG. 3, a second trunnion 122B of the second seal segment 120B may be inserted into the second mount hole 112B.

In various embodiments, the engagement between the plurality of mount holes 112 and the plurality of seal segments 120 may facilitate the radial movement of the plurality of seal segments 120 described above. That is, the trunnions 122 (reference number "122" refers collectively to all the individual trunnions 122A, 122B, and 120D shown in the figures) of the plurality of seal segments 120 may be slidable within the radially extending mount holes 112. In various embodiments, however, the engagement between the trunnions 122 and the mount holes 112 may prevent other directions of relative movement between the plurality of seal segments 120 and the annular outer casing 110. For example, the engagement between the trunnions 122 and the mount holes 112 may prevent the seal segments 120 from axially "rolling" or "rocking," thereby facilitating a robust fluid seal between the annular sealing surface 124 cumulatively formed by the plurality of seal segments 120 and the rotating structure 104. That is, the orientation of the annular sealing surface 124, including knife-edge ridges 127, relative to the rotating structure 104 may be maintained constant, thereby prevent leakage and/or damage to the knife-edge ridges 127 that would otherwise result from the misalignment of the annular sealing surface 124 with the rotating structure 104.

In various embodiments, the trunnions 122 and the corresponding mount holes 112 may be cylindrical. In various embodiments, however, the trunnions may have other cross-sectional shapes, and/or may have different sizes and overall dimensions. That is, the scope of the present disclosure is not to be limited by the relative size and the depicted geometry of the trunnions 122 and the mount holes 112 shown in the figures.

As mentioned above, the plurality of spring components 130 are coupled to the annular outer casing 110 and the plurality of seal segments 120. The plurality of spring components 130 are configured to bias the radial movement of the plurality of seal segments 120 relative to the annular outer casing 110 (and/or relative to the rotating structure 104). The plurality of spring components 130, with reference to FIGS. 2 and 3 and according to various embodiments, may be mechanical spring elements. In various embodiments, however, the spring components 130 may include other ways/manners of imparting a bias to the radial movement of the seal segments 120 (e.g., fluid or pressure modulated spring-like elements). Generally, the plurality of spring components 130 facilitate maintaining a robust fluid seal between the annular seal 100 and the rotating substance and absorb/attenuate radial fluctuations that would otherwise cause damage to the components of the annular seal 100 or the rotating structure 104. In various embodiments, the spring components 130 may include features that restrict and/or limit the radial movement (both radially inward movement and radially outward movement) of the seal segments 120. For example, and with reference to FIG. 2B, the spring components 130 may include integral stops 132D that engage each other to limit radially outward movement and that engage opposing segments of the spring component 130D to limit radially inward movement.

In various embodiments, and with reference to FIGS. 2A, 2B, and 3, the plurality of spring components 130 includes two spring components per seal segment of the plurality of seal segments 120. For example, a first seal segment 120A of the plurality of seal segments 120 may have a forward spring component 130A disposed on and coupled to a forward side of the first seal segment 120A and an aft spring component 130B disposed on an coupled to an aft side of the first seal segment 120A. In various embodiments, and with reference to FIG. 2B, the plurality of spring components 130 may be coupled to, for example, a flange 115 of the annular outer casing 110 and a radially outer surface 125 of the plurality of seal segments 120. In various embodiments, the flange 115 and/or the radially outer surface 125 may include one or more sockets 116, 126 (respectively) that are configured to engage one or more complementary circular protrusions 136 of the spring components 130. In such a configuration, the spring components 130 are detachably coupled between the annular outer casing 110 and the seal segments 120.

In various embodiments, the annular seal 100 may include various other components, such as a forward support ring 101 and an aft support ring 102. In order to clearly show the underlying components, such as spring components 130B, 130D, and 130F, the aft support ring 102 in FIG. 2B has been illustrated to be transparent. The support rings 101, 102 may facilitate holding the spring components 130 in place. In various embodiments, each of the support rings 101, 102 has a unitary structure. In various embodiments, the annular seal 100 may also include an annular retention plate 103 that engages either a forward or an aft portion of the plurality of seal segments 120 to prevent axial movement of, and to otherwise stabilize and retain, the seal segments 120. The annular retention plate 103 may form an axial fluid seal that is substantially maintained during and/or throughout the radial movement/fluctuation of the seal segments 120. In various embodiments, the annular retention plate 103 may be a unitary annular plate.

Figure 4:
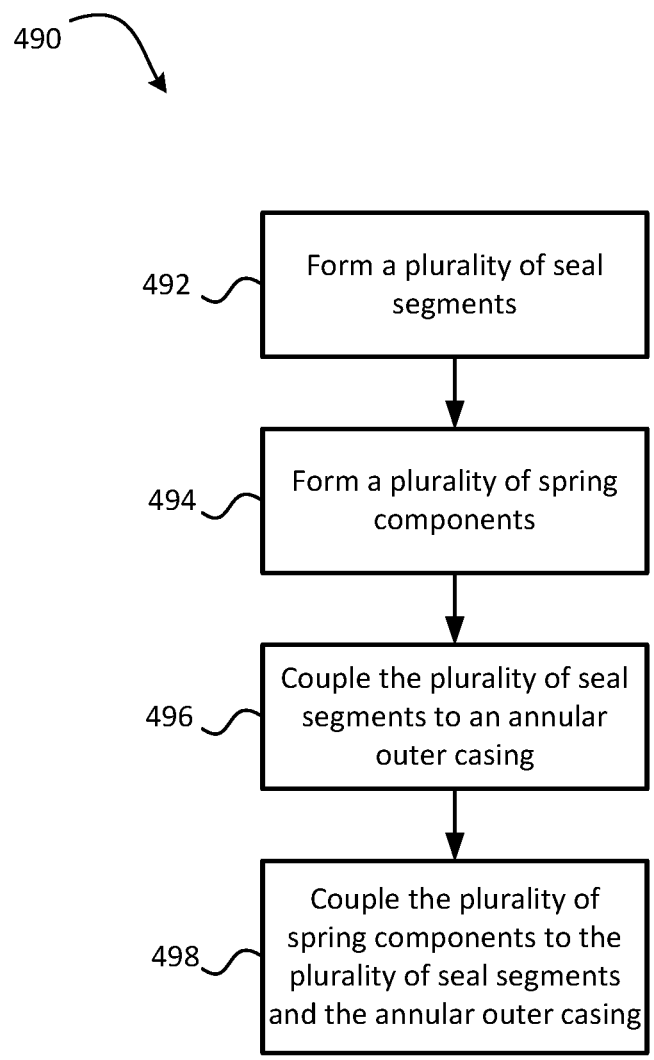
FIG. 4 is a schematic flowchart diagram of a method of manufacturing an annular seal, in accordance with various embodiments.

In various embodiments, and with reference to FIG. 4, a method 490 of manufacturing the annular seal 100 is disclosed. The method 490 may include forming the plurality of seal segments 120 at step 492 and forming the plurality of spring components 130 at step 494. As mentioned above, forming these components 120, 130 may be performed separately and thus may be separable and independent of each other. Also as mentioned above, because the method 490 includes forming multiple arcuate sections (e.g., the seal segments 120), step 492 of the method 490, when compared with conventional methods of manufacturing unitary seals, does not involve the same degree of material and time investment. Additionally, by individual forming the seal segments 120, a greater range of manufacturing practices (e.g., casting, molding, machining, etc.) and materials are available to be used to form the seal segments 120.

In various embodiments, the plurality of seal segments 120 may be made from a metallic material, such as steel, nickel based alloy, and/or a cobalt based alloy, among others. For example, the seal segments 120 may be made from a high performance nickel-based super alloy (e.g., an alloy that comprises, by wt %, 58% nickel, 19% chromium, 13% cobalt, 4% molybdenum, 3% titanium and 1.4% aluminum that is available under the trade name Waspaloy™, available from Special Metals Corporation of New Hartford, N.Y., USA). In various embodiments, the seal segments 120 may be made from a cobalt-nickel-chromium-tungsten alloy. In various embodiments, the material of the seal segments 120 may provide mechanical wear resistance, may be lubricious, and/or may be resistant to corrosion. In various embodiments, the seal segments 120 may include one or more surface coatings.

In various embodiments, the method 490 further includes coupling the plurality of seal segments 120 to the annular outer casing 110 at step 496 and coupling the plurality of spring components 130 to the plurality of seal segments 120 and the annular outer casing 110 at step 498. As mentioned above, step 496 may include inserting trunnions 122 of the plurality of seal segments 120 into the radially extending mount holes 112 of the annular outer casing 110. In various embodiments, step 498 may including coupling a forward spring component 130A and an aft spring component 130B, of the plurality of spring components 130, to a forward portion of each spring component and an aft portion of each spring component, respectively. In various embodiments, the method 490 may further include attaching/coupling the annular seal 100 to an engine case or some other static structure of the gas turbine engine 20 by using one or more retaining features (retaining rings, retaining clips, etc.).

A first component that is "axially outward" of a second component means that a first component is positioned at a greater distance in the aft or forward direction away from the longitudinal center of the gas turbine along the longitudinal axis of the gas turbine, than the second component. A first component that is "axially inward" of a second component means that the first component is positioned closer to the longitudinal center of the gas turbine along the longitudinal axis of the gas turbine, than the second component.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis. For example, a first component of a combustor that is radially inward or radially outward of a second component of a combustor is positioned relative to the central longitudinal axis of the combustor.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An annular seal comprising:
   an annular outer casing comprising a flange and a portion defining a plurality of radially extending mount holes;
   a plurality of seal segments, wherein:
   the plurality of seal segments is coupled to the annular outer casing to cumulatively form an annular sealing surface, wherein each seal segment of the plurality of seal segments comprises a trunnion, wherein the trunnion of each seal segment of the plurality of seal segments is configured to be received within a respective one of the plurality of radially extending mount holes;
   the annular sealing surface is configured to face a rotating structure to inhibit fluid leakage between the rotating structure and the annular sealing surface; and
   each seal segment of the plurality of seal segments is configured for independent radial movement relative to other seal segments of the plurality of seal segments; and
   a plurality of spring components configured to bias the plurality of seal segments relative to the radial movement, wherein the plurality of spring components are disposed at least one of forward of and aft of the portion of the annular outer casing such that the plurality of spring components are disposed outside of the plurality of radially extending mount holes.

2. The annular seal of claim 1, wherein the trunnion of each seal segment of the plurality of seal segments is configured to slide within a respective one of the plurality of radially extending mount holes.

3. The annular seal of claim 1, wherein the plurality of radially extending mount holes are cylindrical and the trunnion of each seal segment of the plurality of seal segment is cylindrical.

4. The annular seal of claim 1, wherein the plurality of spring components are independent of and separable from the plurality of seal segments.

5. The annular seal of claim 1, wherein the plurality of spring components comprises two spring components per seal segment of the plurality of seal segments.

6. The annular seal of claim 5, wherein the two spring components comprise a forward spring component and an aft spring component.

7. The annular seal of claim 6, wherein the forward spring component and the aft spring component are coupled to the flange of the annular outer casing and to a radially outer surface of each seal segment of the plurality of seal segments.

8. The annular seal of claim 1, wherein the plurality of spring components are positioned against at least one of a forward side and an aft side of the portion of the annular outer casing.

9. The annular seal of claim 8, further comprising a support ring configured to hold the plurality of spring components between the support ring and at least one of the forward side and the aft side of the portion of the annular outer casing.

10. The annular seal of claim 1, wherein each spring component of the plurality of spring components comprises opposing segments and integral stops, wherein the integral stops are configured to engage each other to limit radially outward movement and are configured to engage the opposing segments to limit radially inward movement.

11. A gas turbine engine comprising:
a rotating structure;
an annular outer casing comprising a flange and a portion defining a plurality of radially extending mount holes;
a plurality of seal segments, wherein:
the plurality of seal segments is coupled to the annular outer casing to cumulatively form an annular sealing surface, wherein each seal segment of the plurality of seal segments comprises a trunnion, wherein the trunnion of each seal segment of the plurality of seal segments is configured to be received within a respective one of the plurality of radially extending mount holes;
the annular sealing surface is configured to face the rotating structure to inhibit fluid leakage between the rotating structure and the annular sealing surface; and
each seal segment of the plurality of seal segments is configured for independent radial movement relative to other seal segments of the plurality of seal segments; and
a plurality of spring components configured to bias the plurality of seal segments relative to the radial movement, wherein the plurality of spring components are disposed at least one of forward of and aft of the portion of the annular outer casing such that the plurality of spring components are disposed outside of the plurality of radially extending mount holes.

12. The gas turbine engine of claim 11, wherein the rotating structure is a rotating shaft of the gas turbine engine.

13. The gas turbine engine of claim 11, wherein the rotating structure is a series of airfoil rotors of the gas turbine engine.

14. The gas turbine engine of claim 11, wherein the annular outer casing is coupled to at least one of a fan section, a compressor section, and a turbine section of the gas turbine engine.

15. A method of manufacturing an annular seal, the method comprising:
forming a plurality of seal segments;
forming a plurality of spring components that are independent of and separable from the plurality of seal segments;
coupling the plurality of seal segments to an annular outer casing such that the plurality of seal segments cumulatively forms an annular sealing surface, wherein the annular outer casing comprises a flange and a portion defining a plurality of radially extending mount holes, wherein each seal segment of the plurality of seal segments comprises a trunnion, wherein coupling the plurality of seal segments to the annular outer casing comprises inserting the trunnion of each seal segment of the plurality of seal segments into a respective one of the plurality of radially extending mount holes; and
coupling the plurality of spring components to the plurality of seal segments and the annular outer casing, wherein the plurality of spring components are disposed at least one of forward of and aft of the portion of the annular outer casing such that the plurality of spring components are disposed outside of the plurality of radially extending mount holes.

16. The method of claim 15, wherein coupling the plurality of seal segments to the annular outer casing comprises inserting trunnions of the plurality of seal segments into radially extending mount holes of the annular outer casing.

17. The method of claim 15, wherein coupling the plurality of spring components to the plurality of seal segments comprises coupling a forward spring component and an aft spring component, of the plurality of spring components, to a forward portion of each spring component and an aft portion of each spring component, respectively, of the plurality of spring components.

18. The gas turbine engine of claim 11, wherein:
the plurality of spring components comprises two spring components per seal segment of the plurality of seal segments;
the two spring components comprise a forward spring component and an aft spring component; and
the forward spring component and the aft spring component are coupled to the flange of the annular outer casing and to a radially outer surface of each seal segment of the plurality of seal segments.

19. The gas turbine engine of claim 11, wherein:
the plurality of spring components are positioned against at least one of a forward side and an aft side of the portion of the annular outer casing; and
the gas turbine engine further comprises a support ring configured to hold the plurality of spring components between the support ring and at least one of the forward side and the aft side of the portion of the annular outer casing.

20. The gas turbine engine of claim 11, wherein:
each spring component of the plurality of spring components comprises opposing segments and integral stops;
the integral stops are configured to engage each other to limit radially outward movement; and
the integral stops are configured to engage the opposing segments to limit radially inward movement.

* * * * *